United States Patent
Grohmann et al.

(10) Patent No.: US 6,518,983 B1
(45) Date of Patent: Feb. 11, 2003

(54) DISPLAY OF MESSAGES FROM A PLURALITY OF PROCESSES RUNNING IN PARALLEL

(75) Inventors: Ralf Grohmann, Stuttgart (DE); Sebastian Wedeniwski, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/528,514

(22) Filed: Mar. 20, 2000

(30) Foreign Application Priority Data

Jul. 21, 1999 (DE) .......................... 199 34 233

(51) Int. Cl.[7] .................................. G09G 5/00
(52) U.S. Cl. .................. 345/781; 345/788; 345/790; 345/859; 345/858; 345/809
(58) Field of Search ................. 345/677, 681, 345/710, 734, 736, 737, 750, 763, 781, 788, 790, 794, 795, 859, 858, 803, 802, 767, 809, 772, 312, 711, 712, 808, 804, 805; 709/313, 314, 315

(56) References Cited

U.S. PATENT DOCUMENTS

| 5,579,472 A | * | 11/1996 | Keyworth et al. | ......... 340/7.29 |
| 5,590,265 A | * | 12/1996 | Nakazawa | .................. 345/790 |
| 5,784,615 A | * | 7/1998 | Lipe et al. | .................. 709/324 |
| 6,429,883 B1 | * | 8/2002 | Plow et al. | ................. 345/768 |

* cited by examiner

*Primary Examiner*—Kristine Kincaid
*Assistant Examiner*—Thomas J Joseph
(74) *Attorney, Agent, or Firm*—Jeanine S. Ray-Yarletts

(57) ABSTRACT

A method is provided which allows the display of messages, and particularly error or fault messages, from a plurality of user applications in data processing (processes) which are running in parallel with one another to be improved. The method relates in particular to the display of message of this kind which call for action by the user. Messages from processes running in background can be displayed in such a way that the user is not forced to interrupt the work he is doing at that moment.

9 Claims, 3 Drawing Sheets

DISPLAY OF MESSAGES FROM A PLURALITY OF PROCESSES RUNNING IN PARALLEL

The present application is related to application Ser. No. 09/528,639 entitled A Method and System for Indicating Status Using Tabs filed herewith and assigned to the assignee of the present application.

FIELD TO WHICH THE INVENTION RELATES

The present invention relates in general to the display of messages, and particularly error or fault messages, from a plurality of user applications in data processing (processes) which are running in parallel with one another. It relates in particular to the display of messages of this kind which call for action by the user. Specifically, the present invention relates to a method which makes it possible for the messages from processes running in background to be displayed in such a way that the user is not forced to interrupt the work he is doing at that moment.

BACKGROUND OF THE INVENTION

In the multitasking operating systems which are in widespread use at the present time it is normal for many processes to be running virtually in parallel one beside the other. Even user applications take advantage of this capability. Whereas formerly it was quite normal to exit an application before starting another one, today one jumps straight back and forth between different applications which are running in parallel. The changeover in this case is made either by pressing a key combination (e.g. Alt-Tab in Windows) or by clicking with the mouse on the desired application window or on the representation of the application on a shortcut bar or the like.

What are normally used to display errors or to ask the user for additional information are message boxes, which in each case are shown in foreground. These are generally designed to act as modal boxes, i.e. the window showing the particular application is frozen (i.e. is made inactive) until the user has reacted to the message shown in the message box concerned. This seems sensible enough when the user is given a message which relates directly to the process which is actually active at the time when the message is given but if the message originates from a process which is running in background then the user is forced to interrupt the work he is currently doing.

In more complex environments where the processes in background are actually playing an active role and are not simply waiting for fresh inputs from the user or are not deactivated, then the user may very easily be confused if the work that he is doing in an application (e.g. typing in a text in a word-processing application) is interrupted in this way by an error message from a process running in background. True, it is important to the user that messages which call for action, and in some cases immediate action, on his part should be shown to him at once, but there are nevertheless further disadvantages when the application window which is active at the time is automatically frozen or made inactive when the relevant message is shown, namely:

1. Where necessary, the user may have to establish which application generated the error, and may then have to activate it and remedy the error. Hence he is forcibly distracted from the work he is currently doing and later on he may even find trouble in dropping back at the exact spot where he had to break off.
2. If an error message pops up suddenly, it can easily happen that it is accidentally acknowledged and thus cancelled again, such as by pressing the return key in the course of typing in text. The only way the user can then find the source of the error message, if indeed he can do so at all, is by a laborious search through all the applications which are running.
3. Generally speaking, the only way in which an application can tell the user what its status is is by means of a message box or directly in one of the application windows, e.g. on a status bar. The disadvantage which this has is either that the work the user is doing is interrupted or that it may in certain circumstances be a considerable time before the user learns the details of the change in the status of the process that generated the error, the reason being that he first has to bring the process into foreground (activate it) before he can check its status.

If one then considers not a simple environment such as the "normal" use of a modern-day PC but more complex business processes, then the problems described above become even more acute.

DESCRIPTION OF THE PRIOR ART

As already indicated, it is standard practice nowadays for message boxes to be shown in the fore round of the screen when an application wants to ask the user for information or display an error message or some other message. Showing the status of a process as well as showing messages, etc. is normally achieved in a way specific to each individual software program or function, generally by showing the status on a status bar in a part of the main window. In Lotus Notes for example the fact that a network transfer is taking place is indicated by a lightningflash symbol in the bottom left-hand corner of the window. Another example is the hourglass symbol which is shown (in Windows for example) when a given function is running and the user cannot perform any inputs.

To save detailed error or fault information so that the error or fault can be traced, it is possible for messages to be written to a central log. A typical representative of logs of this type is for example the Windows NT event log. The user can employ a special program to call up this log and analyse the error message or messages contained in it. However, even with this facility, it is still usual for a message box to be displayed as well, at least when the faults are serious ones (e.g. "System service could not be started" for example when system services could not be started under Windows NT). This message box then makes the active window inactive until the user has acknowledged the message. It is also normal for a message box to be displayed to tell him that there are in fact error messages in the event log (see FIG .1).

FIG. 1 shows an example to illustrate the situation which may be confusing to a user where a plurality of message boxes 4 appear simultaneously. The applications running are 1, 2 and 3 and it is the window for application 2 which is active at the moment.

It is also known for application-specific messages to be exchanged between a plurality of programs by so-called message queueing. What this means is that the messages are placed in queues (enqueued) and are called up again from the queues for interrogation (dequeued). This being so, the applications which communicate with one another via the queues do not necessarily have to be running simultaneously. The queues are named objects in which messages from a given application are stored and from which they can later be called up by a different application. The queues are managed by a so-called queue manager, which is a system program which makes the message queueing facility available to the applications. The message queueing facility itself however serves only to transfer messages between different programs. The information is still displayed, and the program or process states are still monitored, in ways specific to the application.

SUMMARY OF THE INVENTION

The object of the invention is therefore to provide a method which makes it possible for messages and/or error information from a process which is active in foreground to be shown directly to a user and for messages from a process running in background which call for interaction with the user to be shown in foreground in such a way that the user is not forced to interrupt the work he is doing in the application running in foreground.

This object is achieved by the method described in claim 1.

Other advantageous embodiments of the method according to the invention are described in the subclaims.

DETAILED DESCRIPTION OF THE INVENTION

Figure 1:
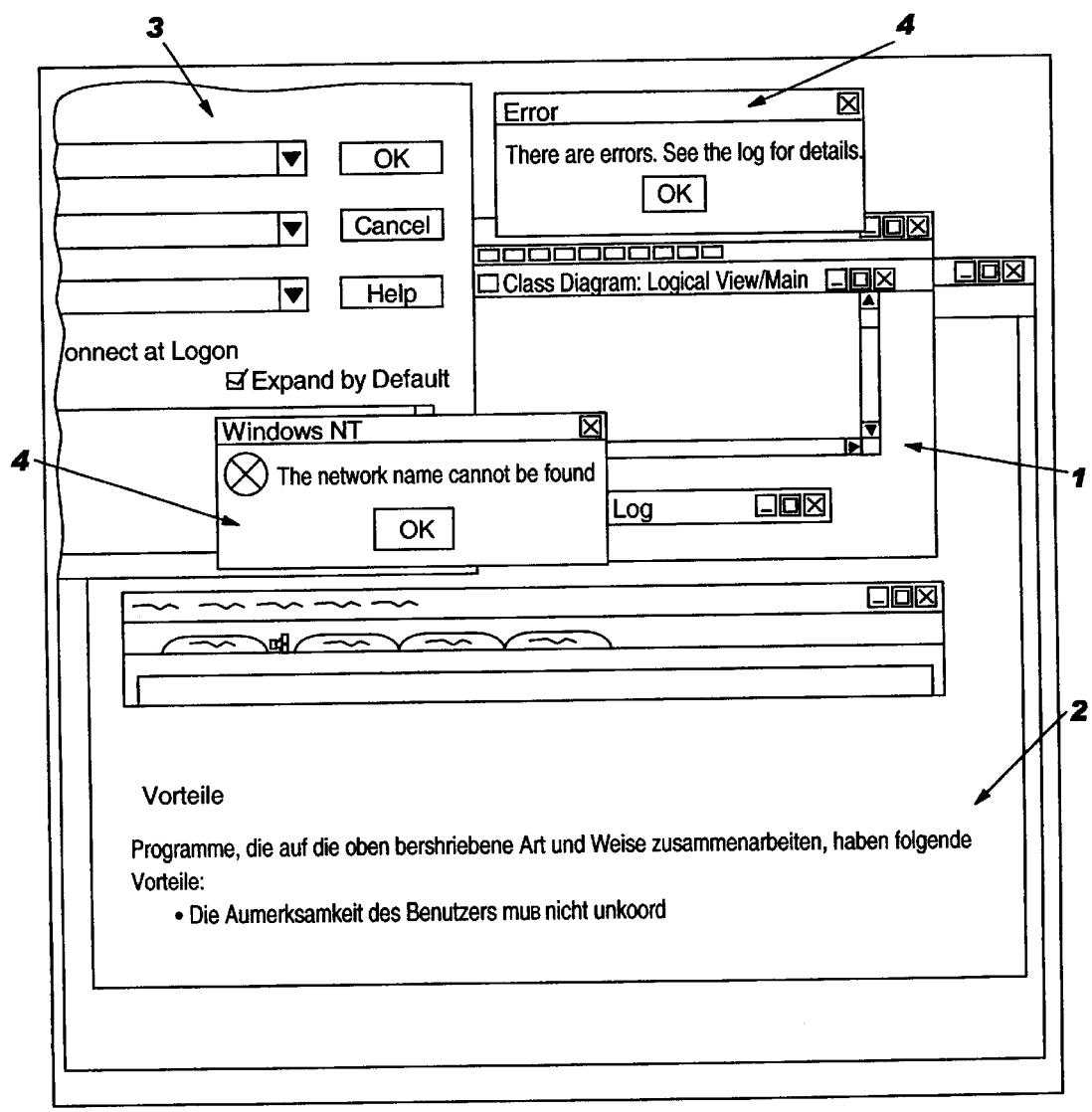
FIG. 1 shows a prior art program window containing a plurality of error and other messages from applications running in background.

A user who is working in a given application ought not to be forced to interrupt the work he is doing at the moment by error messages and/or other messages which appear from processes running in background because 1) unwanted mistakes may be made as a result, and
2) it means that time is being inefficiently used because a human being needs a certain amount of time to "switch over" physically and mentally between the processes and because the stress on the user is increased by the way in which his concentration is frequently spoiled.

It is therefore necessary for the messages generated by different applications to be processed in such a way that they are not shown until the user explicitly wants them to be.

Also, a "channeling" of the messages in this way must be combined with a facility for being able to see and enquire about the statuses of all the relevant processes at any time in some simple manner.

To achieve this, the basic requirements which have to be met are as follows:

1) No application can itself occupy a part of the screen of some arbitrary size but must be displayed in such a way that the user has no trouble seeing the status of other processes running in background.

This can for example be done by having, in an edge region of the window which is currently active, a dedicated bar to show the status at the time of the application which is not being shown. Another possibility is to implement a separate window in such a way that it is always visible in foreground but does not interfere with the work being done in the active window.

2) All messages from, and changes in the status of, the application must be reported to a central point.

For this purpose a central collecting point is required for all the messages. This may for example be a central process, a queue or a file. What is important is that there should be only one central collecting point, i.e. all the messages from the various processes must be reported to this point. In the present case this is done by the interfacing process which is described below.

3) The messages and changes in status must be shown to the user in such a way that he can see at a glance which of the applications needs his attention or requires action to be taken by him.

This may for example be done by using an audio or video indication. In a particularly advantageous embodiment a tab situated in one edge region of the active screen (in for example the dedicated bar mentioned above or the separate window) is given a color appropriate to the type of message or the status of the process involved such as green for applications currently active in background, red for a process which requires user interaction (such as an error message) and grey for an application active in foreground.

In this way it becomes clear to the user what actions he has to perform. By clicking on the appropriate tab, by pressing a socalled hot key or by taking other steps which are known for this purpose, he can then have displayed to him the messages which are waiting from the given process, which are recorded in the appropriate storage area (the message queue).

Another provision which may be made is for all the messages which exist but are not being shown to be saved in a central log, so that they can all be show nd processed or subjected to further analysis even at some later point in time.

The invention is described in detail below by reference to the drawings.

In previous solutions, each process calls up directly the preset system function (GUI-API =Graphical user interface - Application programming interface) for displaying the message box, and the box is immediately displayed on the current screen (see FIG. 1). In other words, as soon as an error for example occurs, the process generates the appropriate message and it is at once shown on the screen (the user interface):

Figure 2:
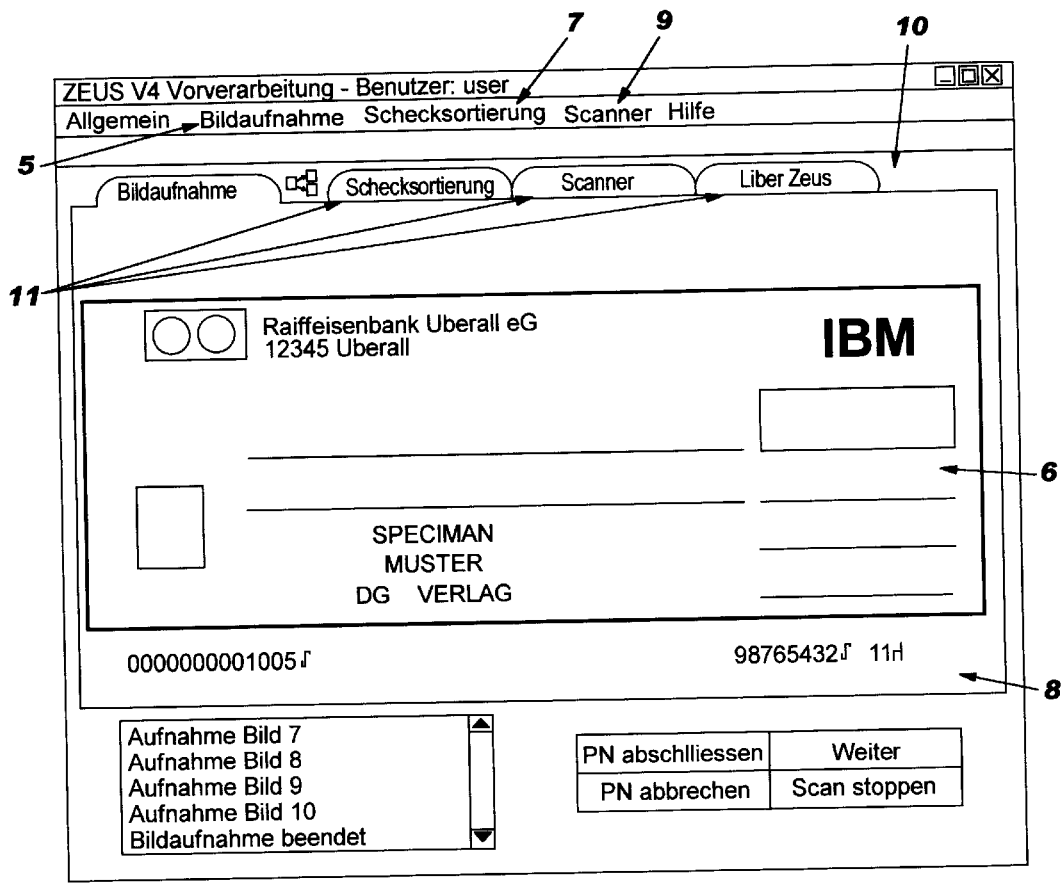
FIG. 2 shows a program window of this kind in accordance with the present invention.

FIG. 2 shows an application (check processing) where the user interface contains three processes running in parallel (image acquisition 5, check sorting 7 and scanning 9); what is showing at the moment (in the "active window" —user interface 8) is image acquisition. It should be pointed out that "active" in this context means that the process concerned is shown on interface 8 and the other two applications 7 and 9 are running in background. The scanned images (checks 6) are shown on interface 8 for checking purposes.

In addition to the three applications which are currently running (image acquisition 5, check sorting 7 and scanning 9), there is also a so-called interfacing process. There are two tasks that this performs. On the one hand it controls the display of the active window, i.e. it manages the bars, etc. which are present in it, and on the other it controls the reception and display of the messages.

It will now be assumed that an error has occurred in the scanning process in the present example.

The error which has occurred is first transmitted as a message to the interfacing process, which the scanning process does by calling up the function responsible for performing this task in the interfacing process. Each application has its own dedicated message queue, which the interfacing process manages and in which the message is placed (stored). Because the processes are running in parallel separately from one another, the particular message queue also needs to be available at all times in the interfacing process, i.e. it must be possible for incoming messages to be accepted at all times. For this reason each message queue has to be implemented within the interfacing process by using a separate thread (i.e. separate lines of execution) because only by using multi-threading is it possible to obtain the requisite characteristics.

Hence the interfacing process is not just a "listener" (i.e. a monitor) which determines the process status and at once displays it but is also a module playing an active part in the message queueing in the following sense:

If there is an entry in the message queue of a particular process, it is dequeued (i.e. shown directly in the active window) only if the associated process is active, i.e. can be seen on the user interface (the active window). This may for example happen as a result of the process concerned being called up by the user, in which case the message is transmitted to the system function (GUI-API) for displaying the message box.

As long as the application is not in foreground (is not active), the message are simply collected in the relevant queue. However, apart from the messages being simply buffered in this way, each incoming message is also checked for type and the corresponding indicator of process status is changed, either by showing the appropriate tab 11 in color or, if desired, by giving an audio signal. What also happens in this case is that the process is suspended. The object which is achieved in this way is that the user can obtain an overview of the status of all the processes without being forced to interrupt the work he is doing in the process which is active at the moment.

Only if the user activates the process which is highlighted in the process status display does the processing of its message queue continue, causing the appropriate message box to be shown. The user interfaces of all the processes which are running can be displayed together in one window or on a bar 10. In summary, this means is that in the case of the present invention the display of separate message boxes (pop-up messages), which are usually placed on top of all the other windows in the process, is controlled by the interfacing process.

The method according to the invention is shown in the following drawing.

Figure 3:
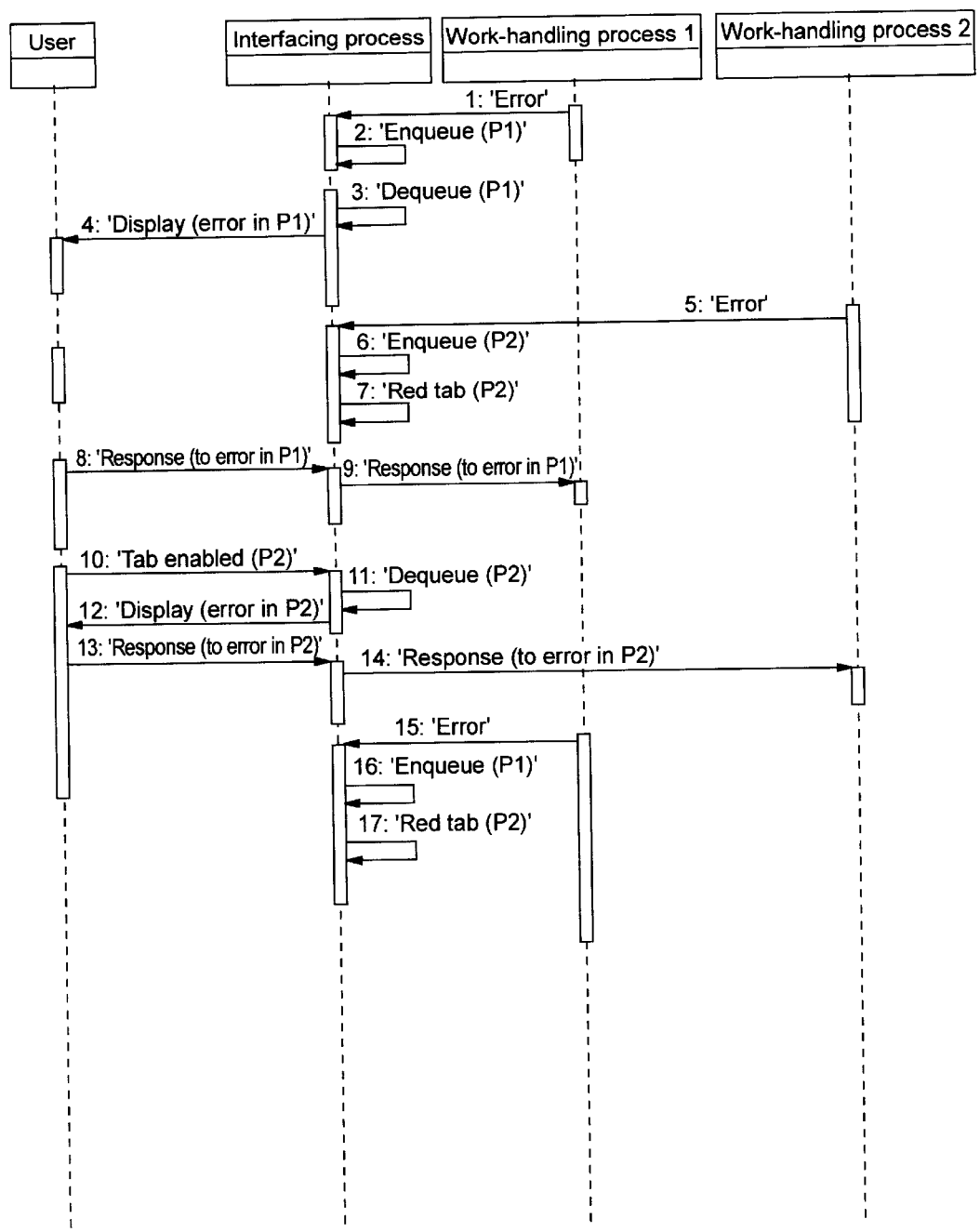
FIG. 3 is a flow chart which elucidates the method according to the invention.

FIG. 3 is a flow chart which again explains the method according to the invention, this time taking two work-handling processes running in parallel as the example. It represents the flow of the messages involved between the user, the interfacing process and the work-handling processes.

At the start, work-handling process 1 is active in foreground, i.e. it is displayed. An error then occurs in this process and this error is transmitted to the interfacing process as a message (1). From there it is placed in the message queue for workhandling process 1 (2). The display thread (the appropriate line of execution) of the interfacing process at once reads the message out from the queue (3), because it is work-handling process 1 which is active in foreground at the moment. The message is then shown to the user (4). The user reads the message and takes actions in response to it, which are reported back to the workhandling process (8, 9).

In the meantime an error has also occurred in work-handling process 2 and this too is reported to the interfacing process (5) and is placed in the appropriate message queue there (6).

Since work-handling process 2 is not active in the foreground at the moment, the appropriate tab is shown in a color, red for example, to tell the user to suspend work-handling process 2 (7).

If the user decides that he wants to deal with the messages which have been generated by work-handling process 2, he enables the appropriate red tab (10), for example by clicking on it with the mouse. This causes the interfacing process to read the appropriate message from the appropriate message queue and display it (11, 12). Work-handling process 2 is then notified of the response by the user (13, 14).

Should a fresh error occur in work-handling process 1 (15–17), it is dealt with as described under 5–7.

The method according to the invention provides the following advantages:

1) The user's attention does not have to be switched between the various processes without any co-ordination. This means that he can work without being interrupted and makes the work more agreeable than it was previously.

2) The user is now less likely to make mistakes because he can concentrate on one job at a time.

3) The user can nevertheless obtain an overview of the general status of all the processes at any time, so that he can take action wherever it is required and can do so efficiently.

4) The fact that the messages belonging to a single process are buffered and shown on request means that connections are easier to spot.

5) The central log provides an overview of all the messages arranged by time.

What is claimed is:

1. Method of displaying messages, and particularly error messages, which call for action by a user from a plurality of processes running in parallel, where one of the processes at a time is active in a foreground window and the other processes are running in background, with an interfacing process which controls the process running in the foreground window managing a dedicated message queue for each of the plurality of processes, and with a process status indication, which the user can interrogate if required, being provided in an edge region of the foreground window for each of the processes running in background, characterized by the following steps a) transmission of the message generated by one of the plurality of processes to the user interface process, b) placing of the message in the message queue belonging to the given process, and c) choosing to:
  i) read the message and direct display thereof in the process which is active in the foreground window when it is the foreground process which generated the message
  ii) leave the message in the message queue and update the process status indication in line with the type of message when it is a process running in the background which generated the message.

2. Method according to claim 1, characterized in that each message queue is implemented by using a separate thread within the interfacing process.

3. Method according to claim 1, characterized in that the process status indication is in the form of a bar.

4. Method according to claim 1, characterized in that the process status indication is in the form of a window.

5. Method according in the claim 1, characterized in that the process status indication is represented in the form of a tab.

6. Method according to claim 5, characterized in that, when a message which was generated by a process running in background is enqueued, the tab is changed visually in line with the type of message.

7. Method according to claim 6, characterized in that the visual change is achieved by means of different colorings.

8. Method according to claim 6, characterized in that an audio signal is also emitted in line with the type of message.

9. Method according to claim 1 or 2, characterized in that all of the messages from the given processes are also stored in a central log.

* * * * *